No. 645,744. Patented Mar. 20, 1900.
A. BISCHOFF.
TREAD FOR STEPS.
(Application filed Jan. 12, 1900.)
(No Model.)
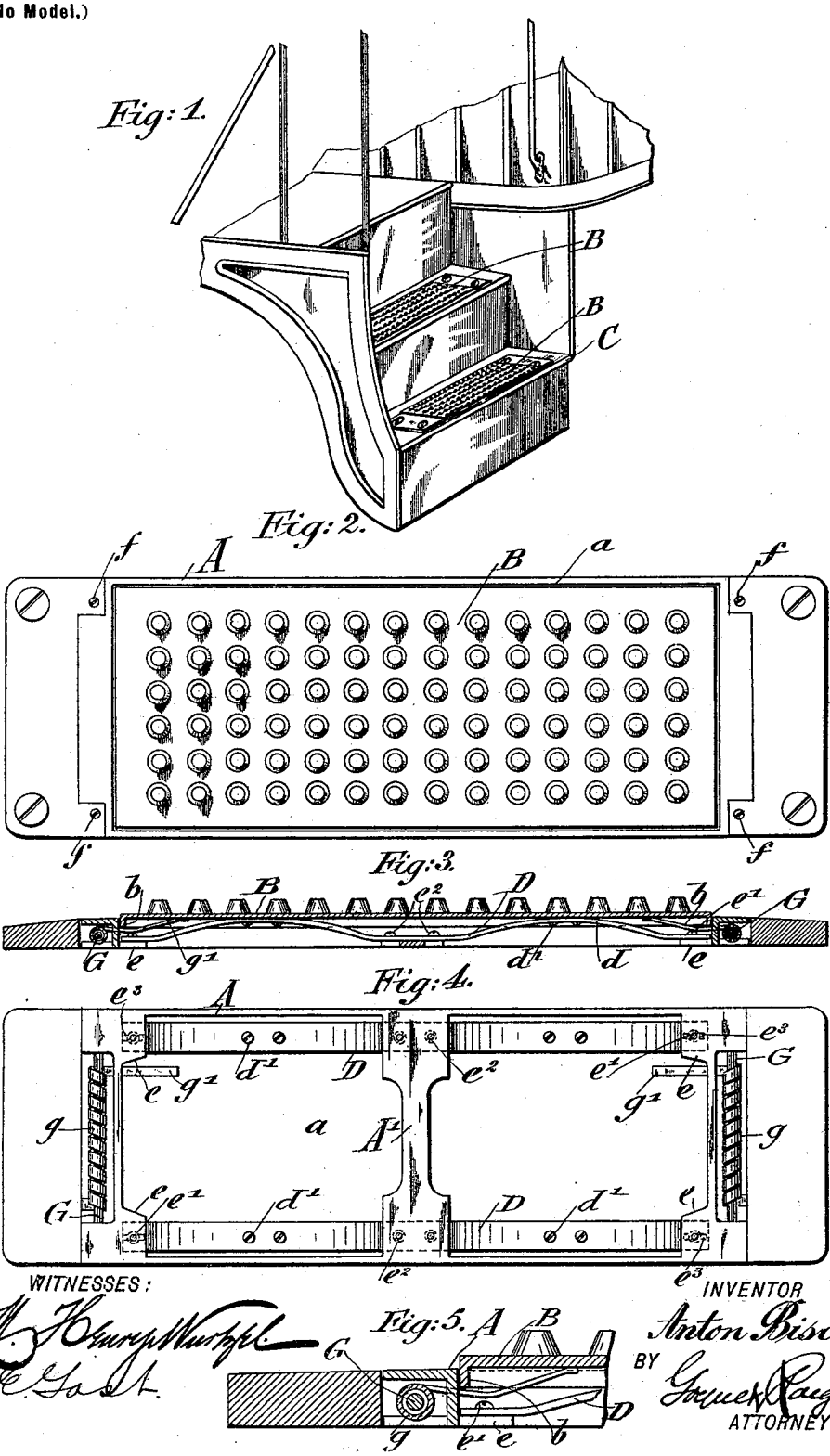

UNITED STATES PATENT OFFICE.

ANTON BISCHOFF, OF NEW YORK, N. Y.

TREAD FOR STEPS.

SPECIFICATION forming part of Letters Patent No. 645,744, dated March 20, 1900.

Application filed January 12, 1900. Serial No. 1,207. (No model.)

*To all whom it may concern:*

Be it known that I, ANTON BISCHOFF, a citizen of the United States, residing in the city of New York, in the borough of Manhattan and State of New York, have invented certain new and useful Improvements in Treads for Steps, of which the following is a specification.

This invention relates to a tread for steps of cars, houses, and the like; and the object of the same is to facilitate a person's mounting or going up the steps, so that there is little jarring to the body and so that there is in consequence less fatigue.

The invention consists of a tread for steps which comprises a frame having an opening, a tread portion fitting into said opening, a cushioning-spring for said tread portion, and means for connecting the cushioning-spring with the frame, all as will be hereinafter described in detail and then particularly claimed.

In the accompanying drawings, Figure 1 is a perspective view of some car-steps to which my improved tread is applied. Fig. 2 is an enlarged plan view of the tread. Fig. 3 is a central longitudinal section of the same. Fig. 4 is an under side of the improved tread; and Fig. 5 is an enlarged detail section, part broken away.

Similar letters of reference indicate corresponding parts.

Referring to the drawings, A indicates the oblong metallic or other frame of the improved tread, one of which is attached at each end, as shown in Fig. 1, to each tread of the pair of car-steps C. Within the opening $a$, formed by the frame A, is a movable spring-actuated tread portion B of a shape corresponding with that of the opening and which normally projects a suitable distance above the frame A. A depending flange $b$ surrounds and projects from the edge of the tread portion B.

D indicates a pair of springs which act on the tread portion to raise it above the frame A, as shown in Fig. 3. These springs are of plate metal in the form of strips bent into shape so as to form humps $d$ and are practically double C-springs flattened out somewhat. The said springs extend longitudinally, one being located at the front edge and the other at the rear edge of the tread portion. The ends of the springs are secured to bearers or ledges $e$ at each corner of the opening $a$ of the frame by means of fastenings $e'$, and the intermediate or middle portions of the springs are secured to a central cross-bar A' of the frame by fastenings $e^2$. The humps $d$ of the springs D are secured to the tread portion by fastenings $d'$. Preferably the holes $e^3$, through which the fastenings $e'$ pass, are elongated, so as to permit a certain sliding motion to the ends of the springs and to secure a better spring action. By the described springs and fastenings a certain spring action is imparted to the tread portion, and the same is connected with the frame, so that it cannot be dislocated. The frame A is provided with end pieces A², which are secured thereto by suitable fastenings $f$. At each end of the frame is arranged a cross pin or rod G, around which are coiled the springs $g$, one end of each of which bears upon the frame, while the other end $g'$ is elongated and projects inwardly under and in contact with the under surface of the tread portion. The auxiliary springs $g'$ are arranged at the front part of the tread portion B and supplement the action of the adjacent springs D, so that the spring action on the front part of the tread portion is greater than on the rear part.

A person mounting the steps equipped with my improvement and walking up will be assisted in stepping from one step to the next, as the springs tend to elevate him or her, thus making it easier to go up and with less fatigue.

The additional springs at the front part of each tread portion are inserted because the greater weight of the body falls there, and for that reason a greater spring action is desirable at the point.

Having thus described my invention, I claim as new and desire to secure by Letters Patent—

1. In a tread for steps, the combination, of a frame having an opening, a tread portion fitted into said opening, a cushioning-spring for said tread portion, and means for connecting the cushioning-spring with the frame and tread portion, substantially as set forth.

2. In a tread for steps, the combination, of an oblong frame having an opening, a tread portion corresponding to and fitting movably in said opening, a cross-bar on the frame, cushioning-springs below said tread portion, and fastenings connecting the springs to the ends of the frame, the cross-bar and the tread portion, substantially as set forth.

3. In a tread for steps, the combination, of an oblong frame having an opening, a tread portion corresponding to and fitting movably in said opening, and suitable springs connected with the frame and acting upwardly on said tread portion, the springs at the front part of the tread being of greater combined strength than those at the rear part, substantially as set forth.

4. In a tread for steps, the combination of a frame having an opening, a tread portion fitting movably in said opening, main cushioning-springs for said tread portion, and auxiliary cushioning-springs arranged only at and acting upon the front part of the tread, substantially as set forth.

In testimony that I claim the foregoing as my invention I have signed my name in presence of two subscribing witnesses.

ANTON BISCHOFF.

Witnesses:
M. H. WURTZEL,
GEORGE C. GEIBEL.